(12) United States Patent
Fine

(10) Patent No.: US 9,747,185 B2
(45) Date of Patent: Aug. 29, 2017

(54) ACCELERATION BENEFIT ESTIMATOR

(71) Applicant: EMPIRE TECHNOLOGY DEVELOPMENT LLC, Wilmington, DE (US)

(72) Inventor: Kevin Fine, Yverdon-les-Bains (CH)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1149 days.

(21) Appl. No.: 13/850,671

(22) Filed: Mar. 26, 2013

(65) Prior Publication Data

US 2014/0297405 A1    Oct. 2, 2014

(51) Int. Cl.
*G06Q 30/02* (2012.01)
*G06F 11/34* (2006.01)
*G06F 11/30* (2006.01)

(52) U.S. Cl.
CPC ...... *G06F 11/3409* (2013.01); *G06F 11/3003* (2013.01); *G06F 11/3062* (2013.01); *G06F 11/3419* (2013.01); *G06F 11/3428* (2013.01); *G06F 2201/865* (2013.01)

(58) Field of Classification Search
CPC ............. G06F 11/3409; G06F 11/3062; G06F 11/3003; G06F 11/3428; G06F 11/3419; G06F 2201/865; Y02B 60/165
See application file for complete search history.

(56) References Cited

U.S. PATENT DOCUMENTS

| 8,250,548 B2 | 8/2012 | Kasahara |
| 2008/0189252 A1* | 8/2008 | Branscome ....... G06F 17/30442 |

FOREIGN PATENT DOCUMENTS

| JP | 04-216174 A | 8/1992 |
| JP | 2008-165746 A | 7/2008 |
| JP | 2012-133778 A | 7/2012 |
| JP | 2013-45219 A | 3/2013 |
| KR | 1020060088717 A | 8/2006 |
| WO | 01-95099 A1 | 12/2001 |
| WO | 2012/094757 A1 | 7/2012 |

OTHER PUBLICATIONS

Arista, Arista Unveils Application Switch, aristanetworks.com/news/pressrelease/447-pr-20120326-01, Mar. 27, 2012, 2 pages.
Borst, Image Processing with FPGAs—GPUs Are Competing, SpectroNet, Konstanz, Apr. 17, 2012, 10 pages.
(Continued)

*Primary Examiner* — Mohamed Charioui
*Assistant Examiner* — Jeremy Delozier
(74) *Attorney, Agent, or Firm* — Jensen & Puntigam, PS

(57) ABSTRACT

Technologies related to acceleration benefit estimation are generally described. In some examples, data centers may identify applications that may benefit from Programmable Hardware Accelerators (PHAs), and test the identified applications by running accelerated versions thereof, i.e., versions that use one or more identified PHAs, and comparing performance of the accelerated versions to reference versions, i.e., versions that do not use the one or more identified PHAs. Data centers may report comparison results may be reported to data center customers to encourage customer adoption of PHAs.

50 Claims, 6 Drawing Sheets

(56) References Cited

OTHER PUBLICATIONS

Chuong, Automatic Compilation of C Applications for FPGA-Based Hardware Acceleration, Abstract, Fourth Int'l Symposium on PAAP, Dec. 9-11, 2011, 2 pages.
Compton, Reconfigurable Coomputing: A Survey of Systems and Software, ACM Computing Surveys, vol. 34, No. 2, Jun. 2002, pp. 171-210.
Gohringer, High-Level Design for FPGA-based Multiprocessor Accelerators, Nov. 15, 2010, 1 page.
Goulding-Hotta, The GreenDroid Mobile Application Processor: An Architecture for Silicon's Dark Future, IEEE Computer Society, 2011, 10 pages.
Hex-Rays Home, IDA: About, Jul. 25, 2012, 2 pages.
Hex-Rays Home, Executive Summary: IDA Pro—at the cornerstone of IT security, 2009, 2 pages.
Kestur, BLAS Comparison onf FPGA, CPU and GPU, Proceedings of the 2010 IEEE Annual Symposium on VLSI, 2010, 6 pages.
Landesman, What is a Virus Signature?, antivirus.about.com, Nov. 30, 2012, 1 page.
Madhavapeddy, Reconfigurable Data processing for Clouds, Field-Programmable Custom Computing Machines (FCCM), 2011, 5 pages.
NIMBIX, Idea to Entrepreneurship, presentation, Mar. 10, 2012, 15 pages.
Pellerin, FPGA-based Hardware Acceleration of C/C++ Based Applications, Part 3, EETimes, Aug. 15, 2007, 19 pages.
Singh, Reconfigurable Data Processing for Clouds, MSDN Blogs, Jan. 18, 2011, 7 pages.
Swanson, GreenDroid: Exploring the Next Evolution in Smartphone Application Processors, IEEE Communications Magazine, Apr. 2011, p. 112-119.
Thierry, Recognition of Binary Patterns by Morphological Analysis, Recon presentation, Jun. 16, 2012, 75 pages.
Thierry, Morphological Analysis for Real-Time Malware Detection, paper including English abstract, Jun. 2011, 36 pages.
Villasenor, The Flexibility of Configurable Computing, Abstract of paper in Signal Processing Magazine, IEEE, vol. 15, Issue 5, Sep. 1998, 1 page.
Wakabayashi, '4K' Video: A Hope for Japan's Electronics Makers?, Internet article, Aug. 14, 2012, 2 pages.
Wang, An Application Mapping Scheme over Distributed Reconfigurable System, Paper for 15th International Conference on Parallel and Distributed Systems (ICPADS), 2009, 8 pages.
Wikipedia, Control Flow Graph, Internet article, Nov. 30, 2012, 4 pages.
Wikipedia, Fork (operating system), Internet article, Nov. 30, 2012, 7 pages.
Wikipedia, Ivy Bridge (microarchitecture), Internet article, Nov. 30, 2012, 7 pages.
Wikipedia, Subgraph isomorphism problem, Internet article, Nov. 30, 2012, 3 pages.
Xilinx, Xilinx Ships World's Highest Capacity FPGA and Shatters Industry Record for Number of Transistors by 2X, PR Newswire via COMTEX, Oct. 25, 2011, 2 pages.

\* cited by examiner

ACCELERATION BENEFIT ESTIMATOR

BACKGROUND

Unless otherwise indicated herein, the materials described in this section are not prior art to the claims in this application and are not admitted to be prior art by inclusion in this section.

The use of programmable hardware, such as Field Programmable Gate Arrays (FPGAs), can yield substantial benefits in energy efficiency and processing speed in computing devices. FPGAs can be programmed with Programmable Hardware Accelerators (PHAs) that specialize in accelerating certain types of operations, for example, video decoding operations and encryption/decryption operations, among others. PHAs can often process their specialized operations more efficiently than general purpose processors. Computer systems may be adapted to use PHAs to process the specialized operations for which they are programmed, while other computing tasks may be processed by general purpose processors such as processors in a computer's Central Processing Unit (CPU).

PHAs deployed at data centers can increase the computing efficiency of applications executed by data center customers. Both data centers and data center customers stand to benefit from adoption of PHAs in the form of lower data center costs and faster performance. However, data center customers who are unfamiliar with the potential advantages of PHAs may be slow to adopt them, to the disadvantage of the customer and the data center.

SUMMARY

The present disclosure generally describes technologies including devices, methods, and computer readable media relating to acceleration benefit estimation. Some example methods may be directed to estimating programmable hardware acceleration benefit in a data center, for example by executing, by computing device(s) in the data center, a reference version of an application to perform tasks for a data center customer; measuring execution time, execution cost, and/or execution energy consumption for executing the reference version of the application; identifying PHAs for the application, wherein the identified PHAs are not being utilized during execution of the reference version of the application; automatically executing, by the computing device(s), an accelerated version of the application to perform the tasks performed by the reference version of the application, wherein the accelerated version of the application is accelerated by use of the identified PHAs; measuring execution time, execution cost, and/or execution energy consumption for executing the accelerated version of the application; calculating a difference in execution time, execution cost, and/or execution energy consumption between the reference version of the application and the accelerated version of the application; and/or providing the calculated difference to the data center customer.

Some example methods may be directed to estimating programmable hardware acceleration benefit in a data center, for example by providing customer-activated acceleration of applications executed by computing device(s) in the data center, wherein the customer-activated acceleration employs PHAs to perform application tasks; selecting an application for which the customer-activated acceleration is not activated by a data center customer; measuring execution time, execution cost, and/or execution energy consumption for executing a reference version of the application without the customer-activated acceleration; automatically executing, by the computing device(s), an accelerated version of the selected application; measuring execution time, execution cost, and/or execution energy consumption for executing the accelerated version of the application; and providing, to the data center customer, a difference in execution time, a difference in execution cost, or a difference in execution energy consumption between the reference version of the application and the accelerated version of the application.

Data centers, computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example data centers and/or computing devices may include a server comprising a processor, a memory, and software and/or hardware components configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
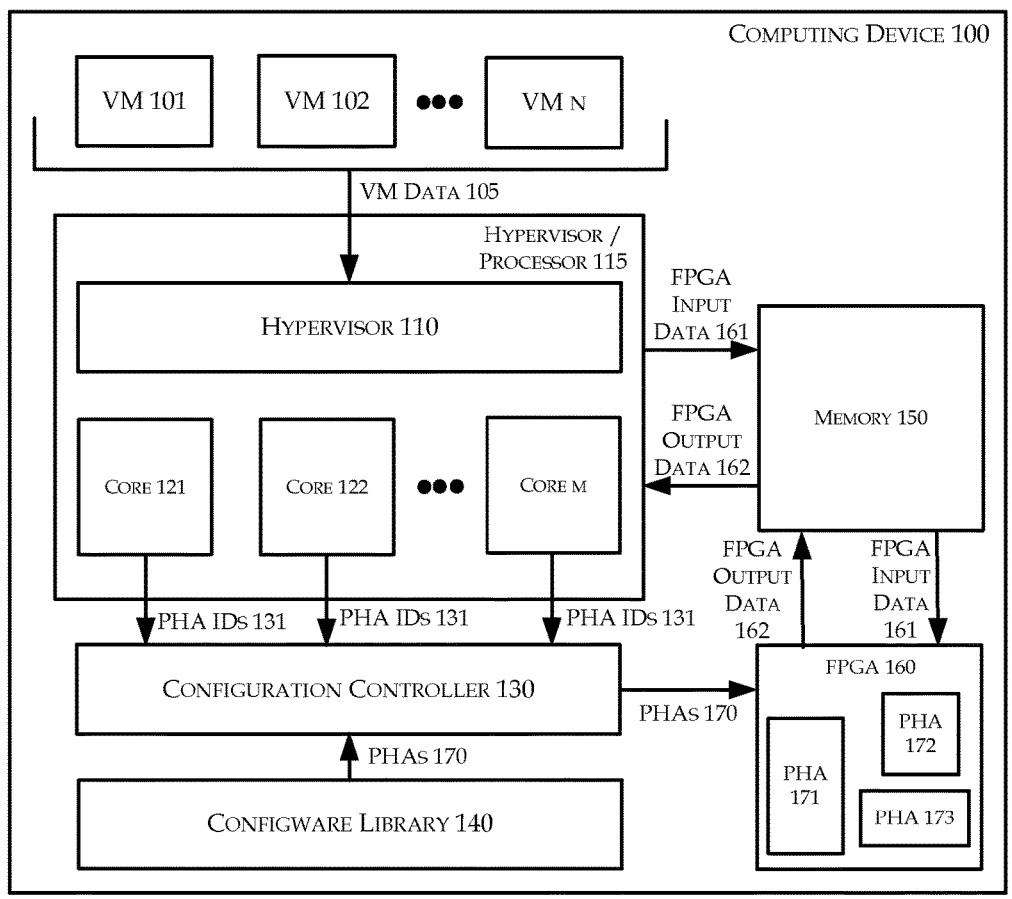
FIG. 1 is a block diagram illustrating an example computing device configured for use in connection with acceleration benefit estimation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to acceleration benefit estimation. In some examples, data centers may identify applications that may benefit from PHAs, and test the identified applications by running (executing) accelerated versions thereof, i.e., versions that use one or more identified PHAs, and comparing performance of the accelerated versions to reference versions, i.e., versions that do not use the one or more identified PHAs. Data centers may report comparison results to data center customers to encourage customer adoption of PHAs.

As stated above, some example methods may be directed to estimating programmable hardware acceleration benefit in a data center, for example by executing, by computing device(s) in the data center, a reference version of an application to perform tasks for a data center customer; measuring execution time, execution cost, and/or execution energy consumption for executing the reference version of the application; identifying PHAs for the application, wherein the identified PHAs are not being utilized during execution of the reference version of the application; automatically executing, by the computing device(s), an accelerated version of the application to perform the tasks performed by the reference version of the application, wherein the accelerated version of the application is accelerated by use of the identified PHAs; measuring execution time, execution cost, and/or execution energy consumption for executing the accelerated version of the application; calculating a difference in execution time, execution cost, and/or execution energy consumption between the reference version of the application and the accelerated version of the application; and/or providing the calculated difference to the data center customer.

In some embodiments, methods may include determining whether programmable hardware resources in the data center are available for use by the data center customer. For example, methods may condition acceleration benefit estimation on the availability of programmable hardware resources in the data center. When programmable hardware resources are available, acceleration benefit estimation may proceed and adoption of PHAs may thereby be encouraged. When programmable hardware resources are not available, methods may postpone acceleration benefit estimation until such time as programmable hardware resources become available.

In some embodiments, methods may include providing customer-activated acceleration of applications, wherein the customer-activated acceleration employs PHAs to perform application tasks. For example, a web based User Interface (UI) may be configured to receive customer application acceleration selections, and data centers may be adapted to implement customer application acceleration selections received via the UI. Methods may estimate acceleration benefits in scenarios wherein customers have not selected to accelerate their applications, and in particular, in scenarios wherein significant acceleration benefits are likely. For example, methods may include selecting an application for which customer-activated acceleration is not activated by a data center customer; measuring one or more of execution time, execution cost, and/or execution energy consumption for executing a reference version of the application without the customer-activated acceleration; automatically executing an accelerated version of the selected application; measuring one or more of execution time, execution cost, and/or an execution energy consumption for executing the accelerated version of the application; and providing, to the data center customer, differences in execution time, execution cost, and/or execution energy consumption between the reference version and the accelerated version of the application. Selected applications for which customer-activated acceleration is not activated may comprise, for example, applications with an identified application type, or applications comprising an identified application segment type, which is established, prior to selecting the application, as operable with at least one identified PHA. The application/application segment type may be known, e.g., from historical experience with the application type, to experience significant acceleration benefit, such as a benefit of 5% or more in execution time, execution cost, and/or an execution energy consumption savings.

In some embodiments, identifying one or more PHAs for an application may comprise analyzing code in the application for a segment that is at least partially replaceable by a PHA. Analyzing code in the application may comprise, e.g., a flow extraction process and/or a hash comparison process. When a replaceable code segment is identified, methods may retrieve a PHA to at least partially replace the segment from a library of PHAs, or method may generate a PHA to at least partially replace the segment.

Some embodiments may include comparing outputs generated by reference versions of applications and accelerated versions of applications to determine whether the compared outputs are substantially identical. Output comparison may be useful in preventing recommendations and/or adoption of PHAs that do not function as intended. Some embodiments may include checking device execution histories of computing devices to verify use of identified PHAs during execution of accelerated versions of applications, e.g., to ensure that identified PHAs are in fact involved in achieving measurable benefits.

In some embodiments, automatically executing accelerated versions of applications may comprise running "full" instances of the accelerated versions, in addition to the reference versions. Some embodiments may conserve resources by forking application execution to execute accelerated segments in parallel with un-accelerated segments of reference applications. For example, automatically executing accelerated versions of applications may comprise forking reference versions of applications to run accelerated segments of applications in parallel with un-accelerated segments executed in connection with the reference versions of the applications.

In some embodiments, methods may perform acceleration benefit estimation in real-time, e.g., in connection with the usage of reference versions of applications by data center customers. Automatically executing accelerated versions of applications may be performed simultaneously with executing reference versions of applications. In some embodiments, acceleration benefit estimation may be done during periods of lower data center demand, e.g., at night or during other periods of low demand Automatically executing accelerated versions of applications may be performed at a different time than execution of reference versions, e.g., during periods of low data center demand, and performance may be compared to performance measurements of previous executions of reference versions of applications. Alternatively, both reference versions and accelerated versions of applications may be executed simultaneously during periods of lower data center demand, e.g., by simulating a customer use case for both the reference versions and accelerated versions of applications.

Embodiments may automate any of the operations discussed herein. For example, determining whether programmable hardware resources in the data center are available/ whether to perform acceleration benefit estimation may self-initiate according to a schedule, thereby eliminating initiation by human operators. Identifying which applications are candidates for acceleration benefit estimation, measuring reference versions of applications, identifying PHAs for applications, executing accelerated versions of applications, measuring accelerated versions of the applications, calculating differences between reference versions of applications and accelerated versions of applications, and/or providing differences to data center customers may be performed automatically, e.g. in response to determining programmable hardware resources are available in the data center, along with successful completion of any of the various other operations as described herein. Other embodiments may include operator input/initiation of any of the various operations described herein.

Some embodiments may be arranged to perform multiple comparisons between reference versions and accelerated versions of applications, to achieve a more complete understanding of the benefits of accelerating applications with PHAs over time. Similarly, some embodiments may estimate programmable hardware acceleration benefits for multiple different applications executed on behalf of a data center customer, to achieve a more complete understanding of the benefits of PHAs for that customer. For example, some embodiments may include aggregating differences between reference versions and accelerated versions of applications corresponding to multiple instances of executing reference versions and accelerated versions of applications, and may provide reports to data center customers summarizing differences over the multiple instances.

FIG. 1 is a block diagram illustrating an example computing device configured for use in connection with acceleration benefit estimation, arranged in accordance with at least some embodiments of the present disclosure. As depicted, FIG. 1 includes a computing device 100 which may comprise, e.g., a server in a data center that is configured to run multiple VMs. Computing device 100 includes VMs 101, 102 . . . , n, a hypervisor/processor 115, a configuration controller 130, a configware library 140, a memory 150, and an FPGA 160. Computing device 100 may be configured to manage n VMs, where n may be any number of VMs and n may vary over time. Hypervisor/ processor 115 includes a hypervisor 110 and processing cores 121, 122 . . . , m. Processing cores 121, 122 . . . , m may include any number of cores. Computing device 100 may load PHAs 171, 172, 173 into FPGA 160.

In FIG. 1, hypervisor 110 may be configured to schedule execution of VMs 101, 102, . . . n by processing cores 121, 122 . . . m. Hypervisor 110 may, for example, perform context switches to switch a processing core 121 between different executing VMs, e.g., VM 101 and VM 102, according to a resource sharing algorithm for computing device 100. In some example embodiments, resources may be shared through a fair-share balancing algorithm, in which a scheduler process may give equal time to each of VMs 101, 102. A variety of other resource sharing algorithms may be used, e.g., assigning weights to VMs 101, 102 to give some VMs more processing time than others. Different VMs may be associated with the same or different data center customers, and each VM may execute applications on behalf of its respective data center customers. Hypervisor 110 may load VM data 105, such as VM state information for one or more of the illustrated VMs, for execution by one or more of the illustrated cores.

Computing device 100 may load PHAs into FPGA 160 to process operations on behalf of any of VMs 101, 102 . . . , n and/or applications executed in those VMs. To load a PHA, any of cores 121, 122 . . . , m may, for example, provide PHA IDs 131 to configuration controller 130. Configuration controller 130 may be adapted to retrieve PHAs 170 corresponding to coprocessor PHA IDs 131 from configware library 140. Configuration controller 130 may be adapted to load PHAs 170 into FPGA 160, e.g., as example PHAs 171, 172, and 173.

In connection with executing VMs, hypervisor/processor 115, configured with VM data 105, may use PHAs for example by placing FPGA input data 161 in memory 150 for processing of FPGA input data 161 by PHAs loaded in FPGA 160, e.g., by PHAs 171, 172, and 173. FPGA 160 and/or PHAs 171, 172, and 173 loaded therein may be adapted to process FPGA input data 161 and to produce FPGA output data 162. FPGA 160 and/or PHAs 171, 172, and 173 loaded therein may place FPGA output data 162 in memory 150. FPGA output data 162 may be retrieved by hypervisor/processor 115 and/or by VMs, or applications within VMs executing therein, and FPGA output data 162 may be stored, used, displayed, further processed, etc., e.g., by VMs for which FPGA output data 162 is produced.

Figure 2:
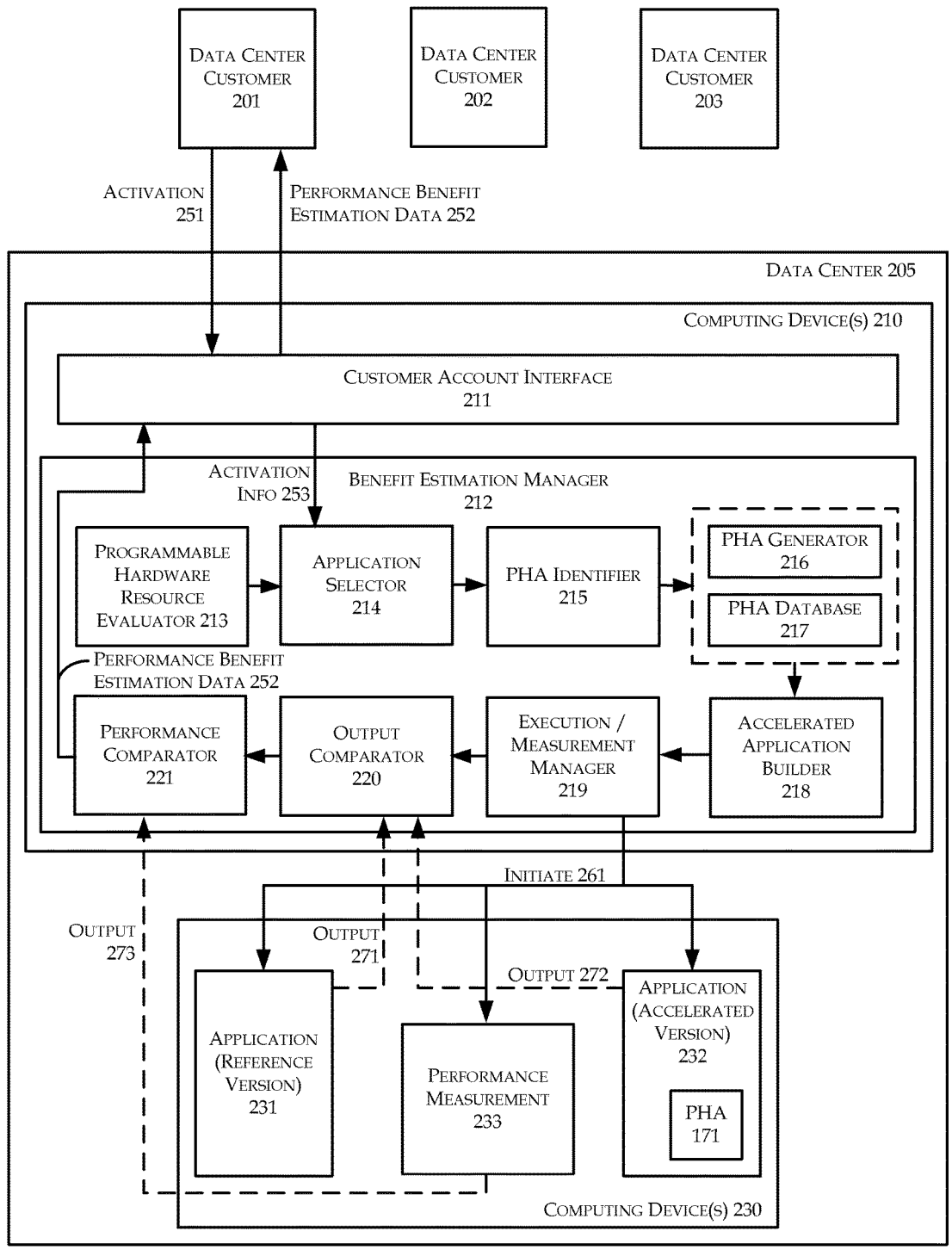
FIG. 2 is a block diagram illustrating a data center configured for PHA benefit estimation.

In some embodiments, a benefit estimation manager component (not shown in FIG. 1) may be included in hypervisor 110, in a VM, in another computing device within a same data center as computing device 100, such as illustrated in FIG. 2, and/or in a combination of such locations. The benefit estimation manager may be configured to manage operations described with reference to FIG. 2 in connection with estimating programmable hardware acceleration benefits. The benefit estimation manager may for example measure performance of a reference version of an application, where for example the reference version may not use PHAs 171, 172, and 173, or where the reference version may use a subset of PHAs 171, 172, and 173. The benefit estimation manager may for example identify a PHA, e.g., PHA 171, 172, and/or 173, execute an accelerated version of the application that makes use of the PHA 171, 172, and/or 173, measure the performance of the accelerated version of the application, and/or compare measurement results to the performance of the reference version of the application, as described herein.

Increased use of PHAs in data centers, such as PHAs 171, 172, and 173 in FPGA 160, may be achieved through the adoption of technologies disclosed herein. Increasing the use of PHAs in data centers can provide significant benefits. Moreover, the benefits of greater PHA adoption may increase as computing technologies continue to evolve. Processor design has become dominated by limits to traditional semiconductor scaling. Feature sizes have become so small that insulation may be a few atoms thick. For example, the current INTEL® Ivy Bridge generation uses 22 nanometer (nm) technologies. Increasing leakage currents result, due to quantum tunneling. Since the tunneling current increases exponentially as the insulation thins, we have entered a new scaling regime for integrated circuits. Instead of the traditional Dennard scaling in which chips used increased chip density and frequency while using the same power, leakage current is now increasing power use by a factor of $S^2$, where S is the factor by which the feature size decreases. This power limitation is especially relevant in battery powered mobile devices, but is also becoming important for data center servers due to thermal limitations. Power use, also referred to herein as energy consumption, is also becoming a major cost in data center operations.

Increasing the availability and adoption of PHAs, e.g., using the technologies described herein, can reduce energy consumption by computing hardware while also improving its performance. This is at least in part because PHAs can perform computations using smaller numbers of transistor transitions than general purpose CPUs. PHAs trade the flexibility of a CPU for increased efficiency. PHAs may possibly achieve decreases of factors of 1000× in time-energy products for parallelizable computations, and up to 10× for computations that cannot be parallelized. As a result, increased adoption of PHAs built on FPGA circuits may provide a solution to the leakage limit problem. Estimating benefits of using PHAs may in some cases demonstrate significant performance improvements associated with accelerated applications, and may thereby encourage PHA adoption, especially as improved computational performance increasingly relies upon PHAs.

FIG. 2 is a block diagram illustrating a data center configured for PHA benefit estimation, arranged in accordance with at least some embodiments of the present disclosure. As depicted, FIG. 2 includes data center customers 201, 202, and 203, and a data center 205. Data center 205 includes computing device(s) 210, and computing device(s) 230. Computing device(s) 210 include a customer account interface 211 and benefit estimation manager 212. Benefit estimation manager 212 includes a programmable hardware resource evaluator 213, an application selector 214, a PHA identifier 215, a PHA generator 216 and/or a PHA database 217, an accelerated application builder 218, an execution/measurement manager 219, an output comparator 220, and a performance comparator 221. Computing device(s) 230 include a reference version 231 of an application, an accelerated version 232 of the application, and a performance measurement module 233.

In FIG. 2, reference version 231 may comprise an application executed within data center 205 on behalf of customer 201. Customer account interface 211 may provide customer-activated acceleration of applications. For example, customer account interface 211 may provide a web based account management UI accessible by customer 201 via the Internet. The account management UI may be configured to receive application acceleration selections, such as activation 251, whereby customer 201 may select acceleration of reference version 231. Data center 205 may be adapted to implement activation 251, inter alia, by employing one or more PHAs to perform application tasks. Data center 205 may be adapted to implement activation 251 by deploying an accelerated version 232 in data center 205.

Customer 201 may or may not choose to provide activation 251. Customer may, for example, choose not to provide activation 251 when customer 201 is unaware of potential acceleration benefits. Data center 205 may apply benefit estimation manager 212 to estimate benefits of activation 251, and to provide performance benefit estimation data 252 to customer 201. Data center 205 may thereby encourage customer 201 to provide activation 251 in view of performance benefit estimation data 252, and in some embodiments, customer 201 may provide activation 251 data after customer 201 receives performance benefit estimation data 252.

In some embodiments according to FIG. 2, data center customers may initially provide applications, such as reference version 231, to data center 205. If an application does not take advantage of acceleration technology, benefit estimation manager 212 may determine whether there are available unused accelerator resources. If available resources exist, benefit estimation manager 212 may run the application through PHA identifier 215 to see if PHAs can be used to replace part of reference version 231. If such PHAs exist, accelerated application builder 218 may create an accelerated runtime package comprising accelerated version 232 to send to computing device(s) 230. Computing device(s) 230 may execute both processes, that is, original reference version 231 and accelerated version 232, in parallel. Note that in some embodiments, the above process may be entirely automatic, not requiring any interaction with data center operators.

In some embodiments, computing device(s) 230 may comprise computing devices such as illustrated in FIG. 1, and computing device(s) 210 may comprise administration devices configured to interface with data center customers 201, 202, and 203 and to perform a variety of administrative and management functions for data center 205. Programmable hardware resource evaluator 213 may be configured to determine whether programmable hardware resources, e.g., FPGA 160, in data center 205 are available for use by data center customer 201, e.g., for accelerating customer 201's reference version 231. For example, programmable hardware resource evaluator 213 may assess whether FPGAs in data center 205 are being fully utilized. In some embodiments, programmable hardware resource evaluator 213 may query hypervisors such as hypervisor 110, or may query FPGA manager processes in computing device(s) 230, for FPGA utilization data. FPGA utilization data may comprise, for example, a percentage of FPGA 160 utilization, an amount of unused resources in FPGA 160, and/or data that provides a proxy for FPGA 160 utilization. Hypervisor 110 and/or other FPGA manager processes may determine FPGA utilization data and return FPGA utilization data to hardware resource evaluator 213. Hardware resource evaluator 213 may aggregate FPGA utilization data across multiple computing devices 230 in data center 205 to determine whether programmable hardware resources are available for use by data center customer 201.

When programmable hardware resources are available, programmable hardware resource evaluator 213 may begin an acceleration benefit estimation process by notifying application selector 214 that programmable hardware resources are available. When programmable hardware resources are not available, programmable hardware resource evaluator 213 may postpone notifying application selector 214 until such time as programmable hardware resources become available.

In some embodiments, application selector 214 may be configured to select applications for which customer-activated acceleration is not activated by data center customer 201. Application selector 214 may identify selected applications, e.g., reference version 231, to PHA identifier 215 for further processing. For example, in some embodiments activation information 253 may indicate applications for which programmable hardware acceleration is activated and/or applications for which programmable hardware acceleration is not activated. Application selector 214 may be configured to select applications for which customer-activated acceleration is not activated, e.g., reference version 231. In some embodiments, application selector 214 may be configured to select applications with an identified application type, and/or applications comprising an identified application segment type, which type application selector 214 may establish, prior to selecting the application, as operable with at least one identified PHA. For example, certain applications are known to perform operations that benefit from programmable hardware acceleration, such as encryption, graphics, and video encoding. These and other applications/application segment types may be known, e.g., from historical experience with the application type, to experience significant acceleration benefit, such as a benefit of 1% or more in execution time, execution cost, and/or an execution energy consumption savings.

In some embodiments, PHA identifier 215 may be configured to identify PHAs for an application, such as reference version 231, wherein the identified PHAs are not being utilized during execution of reference version 231. For example, in FIG. 2, PHA identifier 215 may identify PHA 171 for use in connection with accelerating reference version 231. PHA identifier 215 may identify PHA 171 to accelerated application builder 218, or PHA identifier 215 may retrieve PHA 171 from PHA database 217 and provide the retrieved PHA, e.g., PHA 171, to accelerated application builder 218, or PHA identifier 215 may instruct PHA generator 216 to generate PHA 171 and provide the generated PHA, e.g., PHA 171, to accelerated application builder 218.

In some embodiments, identifying one or more PHAs for an application may comprise analyzing, e.g., by PHA identifier 215, code in an application such as reference version 231 for a segment that is at least partially replaceable by a PHA such as PHA 171. Analyzing code in an application may comprise, e.g., applying a flow extraction process and/or a hash comparison process. When a replaceable code segment is identified, a PHA to at least partially replace the identified segment may be retrieved from a library of PHAs, such as PHA database 217, or generated, such as by PHA generator 216. PHA database 217 and PHA generator 216 may use any available technologies, including those now in use as well as those that may be developed, to retrieve and/or synthesize PHA's.

In some embodiments, accelerated application builder 218 may be configured to build an accelerated version of a selected application, such as accelerated version 232, which is an accelerated version of reference version 231 of the application. In other words, accelerated version 232 and reference version 231 may comprise two different versions of a same application. Accelerated version 232 may utilize PHA 171, while reference version 231 may not use PHA 171. While reference version 231 may in some cases use one or more PHAs, accelerated version 232 may use one or more additional PHAs, such as PHA 171, which are not used by reference version 231. Accelerated version 232 and reference version 231 may take similar or identical inputs and may produce similar or identical outputs; however, accelerated version 232 may operate more efficiently and/or with better performance than reference version 231. Accelerated version 232 may be accelerated by use of the PHA(s) identified by PHA identifier 215, e.g., accelerated version 232 may be accelerated by use of PHA 171.

In some embodiments, accelerated application builder 218 may be configured to create, e.g., instead of a full accelerated version of an application, accelerated segments of an application along with forking instructions. Forking instructions may be configured to cause a reference version of an application to fork into two execution paths, an accelerated execution path and a reference execution path. Computing device(s) 230 may execute an un-accelerated segment of a reference application in a first execution path, and computing device(s) 230 may execute an accelerated segment in parallel in a second execution path. Outputs and performance of the execution paths may be measured and compared as described herein. When the execution of the accelerated segment in the second execution path is complete, output and performance data may be stored for comparison and the second execution path may be terminated, while the first execution path may continue.

In some embodiments, execution/measurement manager 219 may be configured to, e.g., load accelerated version 232 for execution by computing device(s) 230, load performance measurement module 233 for execution by computing device(s) 230, and automatically initiate 261 reference version 231, accelerated version 232, and/or performance measurement 233. Execution/measurement manager 219 may, therefore, execute, by computing device(s) 230, accelerated version 232 to perform tasks performed by reference version 231, wherein accelerated version 232 is accelerated by use of one or more PHAs, such as PHA 171, identified by PHA identifier 215 for use with the application. In some embodiments, execution/measurement manager 219 may copy task instructions or other inputs received from customer 201 for use with reference version 231, and may provide the copied task instructions or other inputs to accelerated version 232.

In some embodiments, execution/measurement manager 219 may automatically execute/initiate accelerated version 232 simultaneously with executing/initiating reference version 231. For example, execution/measurement manager 219 may simultaneously initiate reference version 231 and accelerated version 232 in "real time," that is, in connection with use of reference version 231 by customer 201, or during a simulation during a period of lower data center demand. Execution/measurement manager 219 may initiate performance measurement 233 to simultaneously measure performance of reference version 231 and accelerated version 232. In some embodiments, execution/measurement manager 219 may automatically execute/initiate accelerated version 232 at a different time than execution of reference version 231, e.g., during a period of low data center demand, and performance of accelerated version 232 may be compared to performance measurements of previous executions of reference version 231. Execution/measurement manager 219 may initiate performance measurement 233 to measure performance of reference version 231 and execution/measurement manager 219 may later re-initiate performance measurement 233 to measure performance of accelerated version 232.

In some embodiments, performance measurement 233 may be configured to measure performance of reference version 231 and accelerated version 232. Performance measurement 233 may measure, e.g., one or more of an execution time, an execution cost, or an execution energy consumption for executing reference version 231 and accelerated version 232 on computing device(s) 230. Performance measurement 233 may provide output 273, comprising performance measurement results associated with reference version 231 and accelerated version 232, to performance comparator 221.

In some embodiments, output comparator 220 may be configured to compare outputs 271 and 272 generated by reference version 231 and accelerated version 232 of the application, respectively, to determine whether the compared outputs 271 and 272 are substantially identical. When outputs 271 and 272 are substantially identical, embodiments may proceed to compare performance by performance comparator 221, and to provide performance benefit estimation data 252 to customer 201. When outputs 271 and 272 are not substantially identical, embodiments may discontinue benefit estimation operations such as comparing performance by performance comparator 221 and providing performance benefit estimation data 252 to customer 201. When outputs 271 and 272 are not substantially identical, some embodiments may furthermore either attempt to repeat operations of benefit estimation manager 212 beginning with PHA identifier 215, or may flag reference version 231 as problematic to prevent further attempts by benefit estimation manager 212 to estimate benefits of accelerating reference version 231.

Some embodiments may compare outputs 271 and 272 to determine whether outputs 271 and 272 are identical, while some embodiments may compare outputs 271 and 272 to determine whether outputs 271 and 272 are substantially identical, e.g., anywhere from 90%-100% identical. Determinations of when substantially identical outputs are sufficient to proceed with benefit estimation processes may depend on application type and/or data types of outputs 271 and 272.

In some embodiments, output comparator 220 may be configured to check device execution history(ies) of computing device(s) 230 to verify use of identified PHAs, e.g., PHA 171 during execution of accelerated version 232 of the application. When a device execution history for a device executing accelerated version 232 indicates use of PHA 171, embodiments may proceed to compare performance by performance comparator 221, and to provide performance benefit estimation data 252 to customer 201. When a device execution history for a device executing accelerated version 232 indicates no use of PHA 171, embodiments may either not provide output 273 to performance comparator 221, or may notify performance comparator 221 to omit output 273 from aggregated performance measurements of reference version 231 and accelerated version 232.

In some embodiments, performance comparator 221 may be configured to calculate one or more of a difference in execution time, a difference in execution cost, or a difference in execution energy consumption between reference version 231 of the application and accelerated version 232 of the application. For example, output 273 may comprise measured execution time, execution cost, and/or execution energy consumption information for reference version 231 and accelerated version 232, and performance comparator 221 may calculate differences in any of these measurements. In some embodiments, performance comparator 221 may derive measurements prior to calculating differences, e.g., by deriving execution cost and/or execution energy consumption from execution time measurements included in output 273, and then calculating differences in execution time, execution cost, and/or execution energy consumption. Calculating differences may comprise, e.g., subtracting one measurement from another, e.g., to show that reference version 231 uses 20 minutes more (or any amount more or less) execution time than accelerated version 232, and/or dividing one measurement by another to calculate percent differences, e.g., to show that reference version 231 uses 20% more (or any percent more or less) execution time than accelerated version 232.

In some embodiments, performance comparator 221 may aggregate differences between reference version 231 of the application and accelerated version 232 of the application corresponding to multiple instances of executing reference version 231 and accelerated version 232. For example, execution/measurement manager 219 may initiate execution of accelerated version 232 each time reference version 231 is used over the course of a month (or other period of time), and performance measurement 233 may measure reference version 231 and accelerated version 232 each time reference version 231 and accelerated version 232 are executed. Performance comparator 221 may aggregate resulting measurement outputs such as 273. Performance comparator 221 may then calculate performance differences over the aggregated measurement outputs.

In some embodiments, performance comparator 221 may provide performance benefit estimation data 252 to customer account interface 211. Performance benefit estimation data 252 may comprise the calculated performance differences between reference version 231 and accelerated version 232, e.g., performance benefit estimation data 252 may comprise one or more of the difference in execution time, the difference in execution cost, or the difference in execution energy consumption between reference version 231 and accelerated version 232. In some embodiments, performance benefit estimation data 252 may comprise a report summarizing performance differences between reference version 231 and accelerated version 232 over the multiple instances/executions thereof, e.g., a report summarizing aggregated differences as described herein. In some embodiments, reports may furthermore be aggregated to combine performance differences in connection with multiple different applications, e.g., for all applications for customer 201 which may be candidates for acceleration.

Performance benefit estimation data 252 may be provided to customer 201 via customer account interface 211, and/or by emailing or otherwise communicating performance benefit estimation data 252 to customer 201. An example of providing performance benefit estimation data 252 to customer 201 may for example provide customer 201 with a message such as: "Your IT charges on BigCloud during August 2012 would have run 34% faster and have cost $475 instead of the $654 you paid (i.e., cost) if you had chosen to use the BigCloud Accelerator Project." Of course, many other ways of communicating performance benefits to data center customers are possible.

Figure 3:
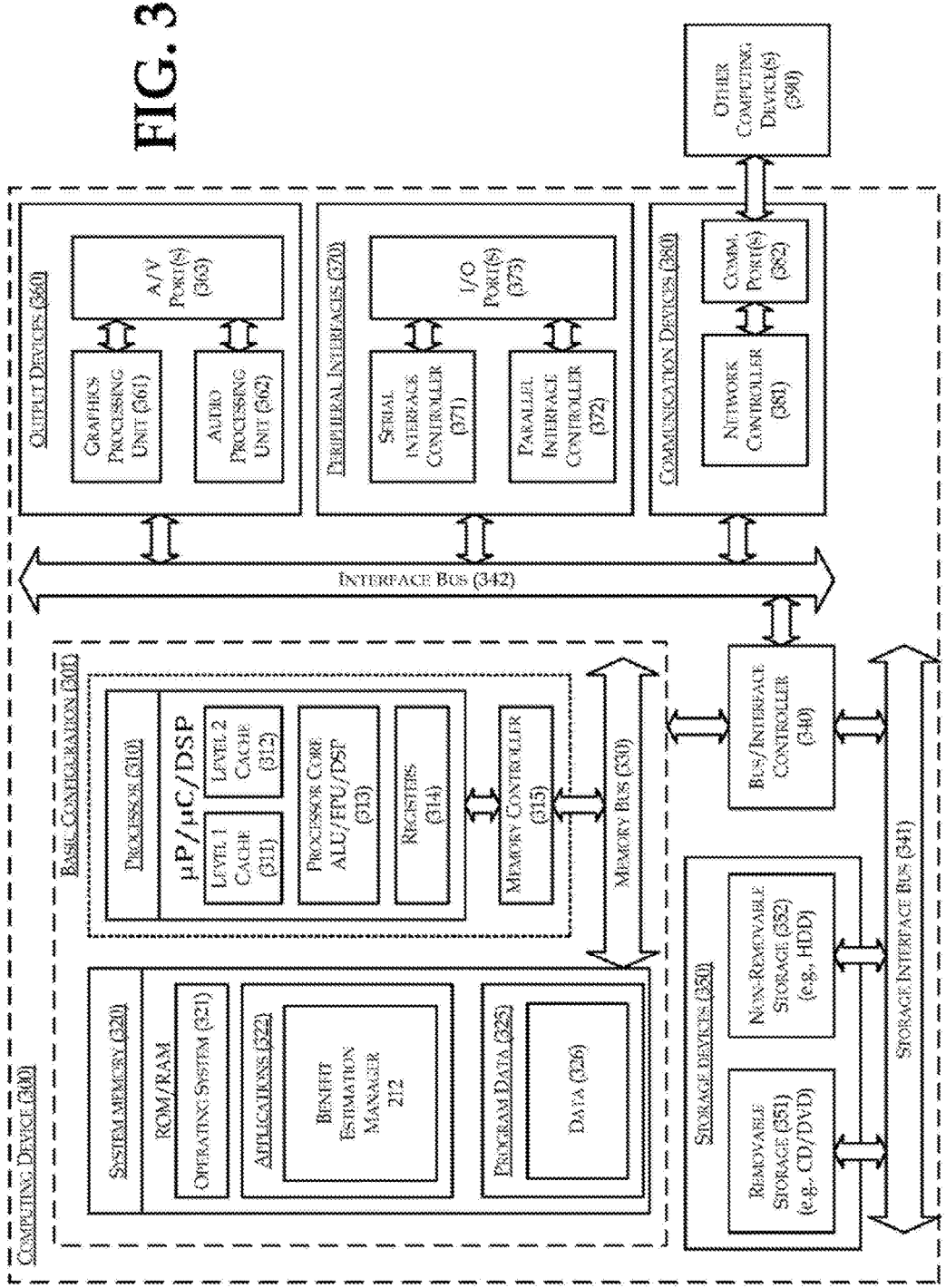
FIG. 3 is a block diagram of a computing device as one example of a device implementing a benefit estimation manager.

FIG. 3 is a block diagram of a computing device 300 as one example of a device implementing a benefit estimation manager, arranged in accordance with at least some embodiments of the present disclosure. In a very basic configuration 301, computing device 300 may include one or more processors 310 and system memory 320. A memory bus 330 may be used for communicating between the processor 310 and the system memory 320.

Depending on the desired configuration, processor 310 may be of any type including but not limited to a microprocessor (µP), a microcontroller (µC), a digital signal processor (DSP), or any combination thereof. Processor 310 may include one or more levels of caching, such as a level one cache 311 and a level two cache 312, a processor core 313, and registers 314. The processor core 313 may include an arithmetic logic unit (ALU), a floating point unit (FPU), a digital signal processing core (DSP core), or any combination thereof. A memory controller 315 may also be used with the processor 310, or in some implementations, the memory controller 315 may be an internal part of the processor 310.

Depending on the desired configuration, the system memory 320 may be of any type including but not limited to volatile memory (such as RAM), non-volatile memory (such as ROM, flash memory, etc.), or any combination thereof. System memory 320 typically includes an operating system 321, one or more applications 322, and program data 325. In some embodiments, operating system 321 may comprise a virtual machine that is managed by a Virtual Machine Manager (VMM). Applications 322 may include, for example, benefit estimation manager 212 or portions thereof. For example, applications 322 may include one or more of programmable hardware resource evaluator 231, application selector 214, PHA identifier 215, PHA generator 216, PHA database 217, accelerated application builder 218, execution/measurement manager 219, output comparator 220, and/or performance comparator 221. Program data 325 may include data 326 that may be used by benefit estimation manager 212 or portions thereof, such as a PHA database 217 and/or output data such as output 271, output 272, or output 273.

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 311, level 2 cache 312, system memory 320, removable storage 351, and non-removable storage devices 352 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium that may be used to store the desired information and that may be accessed by computing device 300. Any such computer storage media may be part of computing device 300.

Computing device 300 may also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more A/V ports 363. Example peripheral interfaces 370 may include a serial interface controller 371 or a parallel interface controller 372, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 373. Other conventional I/O devices may be connected as well such as a mouse, keyboard, and so forth. An example communications device 380 includes a network controller 381, which may be arranged to facilitate communications with one or more other computing devices 390, e.g., with computing device(s) 320, computing devices implementing a customer account interface 211, and/or computing devices operated by data center customers 201, 202, 203, over a network communication via one or more communication ports 382.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 300 may be implemented as a server in a data center. Computing device 300 may also be implemented as any device configured to use FPGA acceleration, such as a network server, an e-commerce server, or a personal or business use computer including both laptop computer and non-laptop computer configurations.

Figure 4:
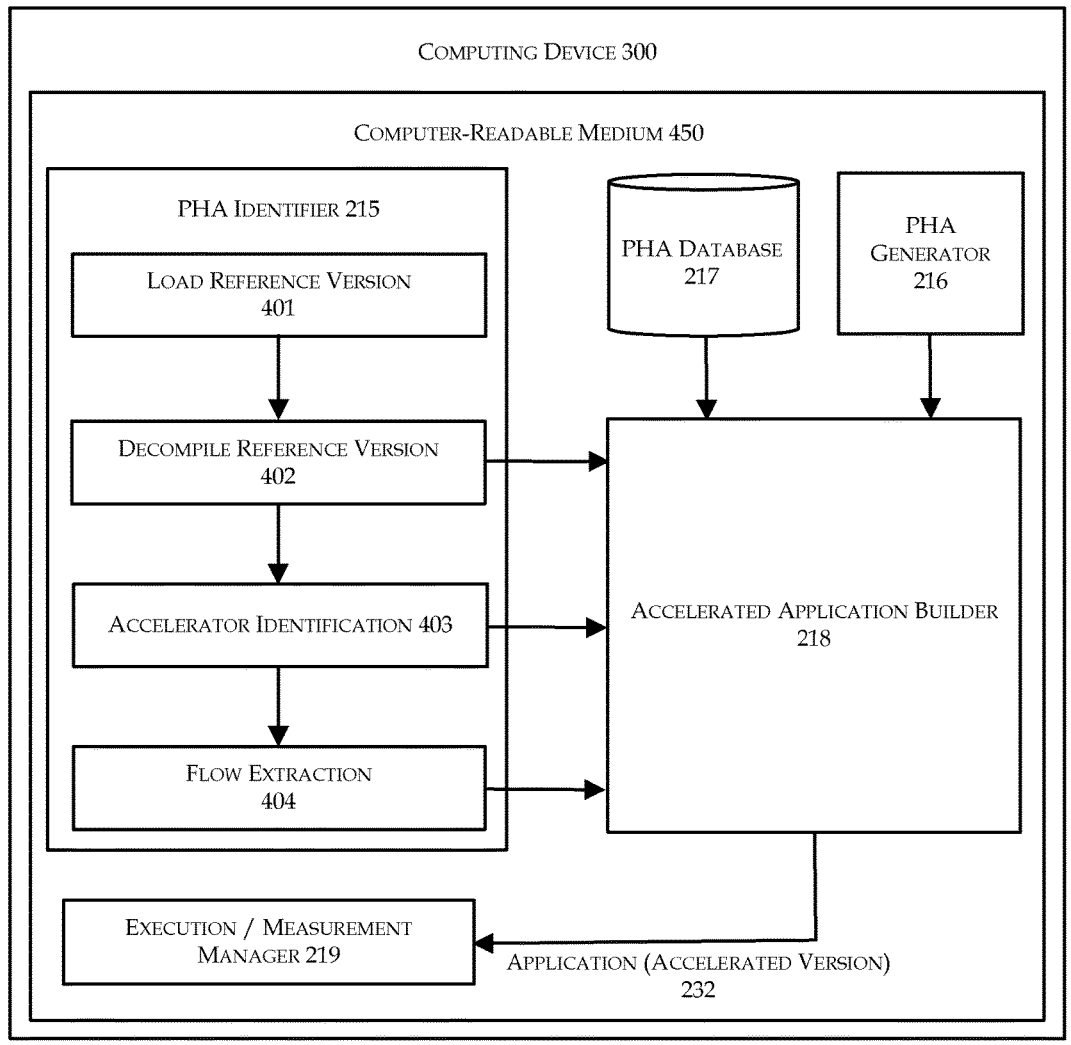
FIG. 4 is a flow diagram illustrating an example method for building an accelerated version of an application.

FIG. 4 is a flow diagram illustrating an example method for building an accelerated version of an application, arranged in accordance with at least some embodiments of the present disclosure. FIG. 4 also includes identifying PHAs for use in building the accelerated version, and initiating the execution of the accelerated version. The example flow diagram may include one or more operations/modules of PHA identifier 215, comprising blocks 401, 402, 403, and 404, accelerated application builder 218, PHA database 217, PHA generator 216, and/or execution/measurement manager 219. The various illustrated blocks represent operations as may be performed in a method, functional modules in a computing device 300, and/or instructions as may be recorded on a computer readable medium 450.

FIG. 4 includes blocks that are illustrated as being performed sequentially, e.g., with block 401 first and block 219 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 4 illustrates an example method by which computing device 300 may identify PHAs for use in connection with an accelerated version of an application, and may build the accelerated version adapted to use the identified PHAs. The illustrated method may generally comprise decompiling a reference version of the application, using the decompiled reference version to identify and/or synthesize PHAs for use with the application, and building the accelerated version which employs the identified/synthesized PHAs. The accelerated version of the application may be provided to execution/measurement manager 219 for execution thereof and performance measurement. In some embodiments, methods according to FIG. 4 may be completely automatic, needing no input from human operators. In some embodiments, methods may include operator interactions.

PHA identifier 215 may comprise a "Load Reference Version" block 401, a "Decompile Reference Version" block 402, an "Accelerator Identification" block 403, and a "Flow Extraction" block 404. "Load Reference Version" block 401 may load a reference version of a selected application into a computing device 300 memory. The reference version may be in executable or "machine language". "Decompile Reference Version" block 402 may decompile the machine language of the reference version, e.g., by producing assembly language, or other higher-level language output representing the reference version. Decompiled code may be provided to accelerated application builder 218 as well as stored for analysis by blocks 403 and 404. In embodiments in which a high-level language version of a reference application exists, blocks 401 and 402 may be omitted. Also, blocks 401 and 402 may be configured as appropriate to handle any reference version input, e.g., high level language, compiled byte code, scripts, compiled code, or otherwise.

"Accelerator Identification" block 403 may search the decompiled assembly language for known algorithms/application segments which are replaceable by PHAs stored in the PHA database 217. Block 403 may identify replaceable algorithms/application segments to accelerated application builder 218, along with identifiers for PHAs stored in the PHA database 217 for use in replacing the identified application segments. "Flow Extraction" block 404 may analyze the flow trees of the decompiled assembly language to identify application segments that may be replaced by synthesized PHAs. Block 404 may identify replaceable algorithms/application segments to accelerated application builder 218, for use in generating PHAs to replace the identified application segments.

PHAs in PHA database 217 and/or synthesized by PHA generator 216 may comprise Hardware Descriptor Language (HDL) descriptor files, which are often called configware. Any digital circuit or application can be created out of these elements. However, configware and HDL programming remains a specialized field, mainly using the skills of electrical engineers as opposed to the software programmers who typically create and manage applications for data center customers. Companies may not have the resources in place to program their own PHAs in HDL to accelerate their applications. Fortunately, the data center can supply coprocessors to customers from either of two sources as illustrated in FIG. 4.

PHA database 217 may comprise, e.g., a library of previously created PHAs. In many cases the same code is repeated in many different applications. For example, ZIP and JPEG processing instructions occur in many applications. Anything that serves web content may likely use ZIP for text, even when just in-lining a few paragraphs. Similarly, viterbi and radix commands form the basis of many different-seeming application codebases, as the low level instructions behind the compilers tend toward specific known operations. As a result, there are many code segments for which it may be worthwhile to create the HDL PHAs and place them in a library such as PHA database 217.

In some embodiments, "Accelerator Identification" block 403 may search an application to see if the application contains code segments for which PHAs exist. This problem is similar to the problem of searching binary files for known viruses. There are several techniques that may be used to find the "fingerprint" of known code. One technique is to create a Control Flow Graphs (CFGs) from the code, and then to do a morphological comparison to CFGs of PHAs in PHA database 217. This is called flow extraction. Another technique is to search for a unique snippet of code in the decompiled reference application. This may be done, e.g., using hash functions.

In some embodiments, "Flow Extraction" block 404 may identify heavily used code inside of loops, and the CFGs of this "hot code" can be extracted and passed to accelerated application builder 218 for conversion to PHAs.

In some embodiments, accelerated application builder 218 may receive decompiled code, application segments and corresponding identifiers of PHAs in PHA database 217, and application segments identified for replacement by synthesized PHAs produced by PHA generator 216. Accelerated application builder 218 may retrieve identified PHAs from PHA database 217 and/or activate PHA generator 216 to synthesize PHAs to replace application segments identified for replacement by synthesized PHAs. Accelerated application builder 218 may, for example, modify received decompiled code of a reference version of an application by inserting the retrieved/synthesized PHAs or references thereto, into the decompiled code, and removing or modifying the application segments identified for replacement. Accelerated application builder 218 may optionally compile the modified code to produce accelerated version 232. Accelerated application builder 218 may provide accelerated version 232 to execution/measurement manager 219 for execution and measurement of accelerated version 232 as described in connection with FIG. 2. In some embodiments, accelerated application builder 218 may send or load accelerated version 232 in a server in computing device(s) 230, and accelerated application builder 218 may notify execution/measurement manager 219 that accelerated version 232 is ready for measurement.

Figure 5:
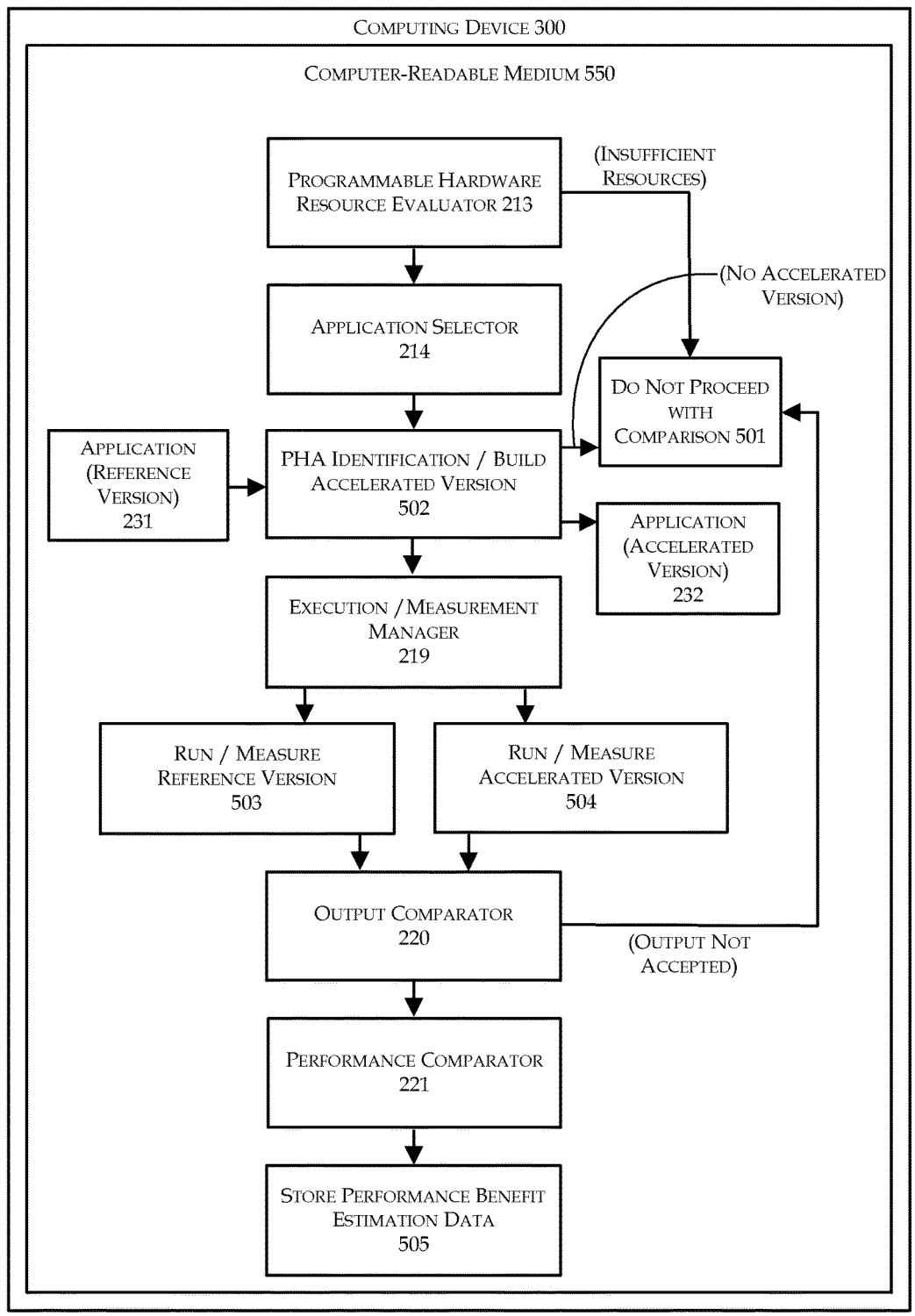
FIG. 5 is a flow diagram illustrating an example method for estimating programmable hardware acceleration benefit.

FIG. 5 is a flow diagram illustrating an example method for estimating programmable hardware acceleration benefit, arranged in accordance with at least some embodiments of the present disclosure. The example flow diagram may include one or more operations/modules as illustrated by blocks 213, 214, 502, 501, 231, 232, 219, 503, 504, 220, 221, and 505, which represent operations as may be performed in a method, functional modules in a computing device 300, and/or instructions as may be recorded on a computer readable medium 550.

FIG. 5 includes blocks that are illustrated as being performed sequentially, e.g., with block 213 first and block 505 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 5 illustrates an example method by which a benefit estimation manager in computing device 300 may determine whether sufficient programmable hardware resources are available in a data center to justify encouraging adoption of PHAs by data center customers, select appropriate applications for benefit estimation, build accelerated versions of applications, measure performance benefits of the accelerated versions in comparison with reference versions of applications, and/or provide performance benefit estimation data to data center customers.

Blocks 213 and 214 are introduced in FIG. 2. At "Programmable Hardware Resource Evaluator" block 213, computing device 300 may determine whether programmable hardware resources in a data center are available for use by data center customers. For example, computing device 300 may determine whether there are unused or partially used FPGAs in computing devices, such as computing device 100, in the data center. In some embodiments, block 213 may quantify available programmable hardware resources for use in determining a number of applications to select for benefit estimation, e.g., at block 214.

When there are insufficient available programmable hardware resources in the data center, e.g., when the available programmable hardware resources are below a predetermined minimum value, which minimum value may be set depending upon the size of the data center, the amount of programmable hardware resources needed to accelerate applications in the data center, and/or other considerations applicable to specific embodiments, then block 213 may be followed by block 501, "Do Not Proceed With Comparison", and the remaining operations illustrated in FIG. 5 may be deferred until such time as block 213 determines that programmable hardware resources are available. When there are sufficient available programmable hardware resources in the data center, block 213 may be followed by block 214, and block 213 may optionally provide a quantity of available programmable hardware resources to block 214.

At "Application Selector" block 214, computing device 300 may select one or more applications to accelerate. In some embodiments, block 214 may select a number of applications that correlates with a quantity of available programmable hardware resources, e.g., by selecting more applications for acceleration when more programmable hardware resources are available in the data center, and selecting fewer applications for acceleration when fewer programmable hardware resources are available in the data center. Block 214 may use any of a variety of application selection criteria. For example, block 214 may select applications for which acceleration is not activated by data center customers, as there may be no need to measure acceleration benefits when data center customers have already accelerated their applications.

In some embodiments, block 214 may select applications with pre-existing accelerated versions, which embodiments may eliminate the use of block 502. When measurement data and/or output comparison data already exists for pre-existing accelerated versions, it will be appreciated that embodiments may also omit blocks 219, 503, 504, 220, and 221.

In some embodiments, block 214 may select applications for which block 502 is equipped to build operable accelerated versions. For example, block 214 may select applications with identified application types or applications comprising identified application segment types, wherein the identified application or application segment types are established, prior to selecting the applications, as operable with at least one identified programmable hardware accelerator in PHA database 217. Block 214 may be followed by block 502.

At a "PHA Identification/Build Accelerated Version" block 502, computing device 300 may perform methods for building accelerated versions of applications according to FIG. 4, e.g., operations in connection with blocks 215, 216, 217, and/or 218 as illustrated in FIG. 4. Block 502 may use reference version 231 to produce accelerated version 232. When no accelerated version can be produced, e.g., due to unavailability of appropriate PHAs in PHA database 217 or inability to synthesize appropriate PHAs by PHA generator 216, then block 502 may be followed by block 502, "Do Not Proceed With Comparison", for the applications that cannot be accelerated. Block 502 may be followed by block 219 for the applications that can be accelerated.

At "Execution/Measurement Manager" block 219, computing device 300 may initiate blocks 503 and/or 504, to run and measure reference version 231 and accelerated version 232. In some embodiments, block 219 may manage execution of accelerated version 232 to perform tasks performed by reference version 231, e.g., by mirroring customer inputs to reference version 231 in the execution path of accelerated version 232.

In some embodiments, a data center customer may initiate reference version 231, and block 219 may for example automatically execute accelerated version 232 at block 504, in response the customer initiation of reference version 231 at block 503. Block 219 may automatically initiate measurement of reference version 231 at block 503 and measurement of accelerated version 232 at block 504. In some embodiments, block 219 may initiate both execution of reference version 231 and accelerated version 232 as well as measurement reference version 231 and accelerated version 232, e.g., to simulate data center customer use of reference version 231 and accelerated version 232 for the purpose of performance measurement. Block 502 may be followed by blocks 503 and 504.

At a "Run/Measure Reference Version" block 503 and a "Run/Measure Accelerated Version" block 504, computing device 300 may cause reference version 231 and/or accelerated version 232 to execute at computing device(s) 230, such as at example computing device 100. Computing device 300 may activate performance measurement 233, illustrated in FIG. 2, to measure performance criteria such as execution time, execution cost, and/or execution energy consumption for executing reference version 231 and accelerated version 232 at computing device(s) 230. Blocks 503 and 504 may provide application outputs from reference version 231 and accelerated version 232 to block 220, and blocks 503 and 504 may provide performance measurement outputs from measurement of reference version 231 and accelerated version 232 to block 221. Blocks 503 and 504 may be followed by block 220.

At "Output Comparator" block 220, computing device 300 may compare outputs generated by reference version 231 and accelerated version 232 to determine whether the compared outputs are substantially identical, as described with reference to FIG. 2. For example, in the case of a video encoding application, reference version 231 and accelerated version 232 may both produce encoded video outputs. The encoded video outputs may be compared at block 220 to determine whether they are identical or substantially identical. Block 220 may accept substantially identical in some embodiments as described herein. For example, in some cases, a PHA in accelerated version 232 may cause accelerated version 232 to produce a different, but nonetheless acceptable output. For example, certain colors in an encoded video may be rendered differently in an output produced by accelerated version 232, but the colors may nonetheless be accepted as "substantially identical" under criteria established for encoded video output comparisons. Block 220 may be followed by block 221 when compared outputs are identical or substantially identical. Block 220 may be followed by block 501, "Do Not Proceed With Comparison" when compared outputs are not identical or substantially identical.

At "Performance Comparator" block 220, computing device 300 may compare performance measurements acquired at blocks 503 and 504. Block 220 may for example calculate one or more of a difference in execution time, a difference in execution cost, and/or a difference in execution energy consumption between reference version 231 and accelerated version 232, as described with reference to FIG. 2. Block 221 may be followed by block 505.

At a "Store Performance Benefit Estimation Data" block 505, computing device 300 may store measurement data acquired at blocks 503 and 504 and/or performance comparison outputs from block 221. For example, block 505 may store performance benefit estimation data in a customer account interface 211 as illustrated in FIG. 2. Block 505 may thereby provide performance benefit estimation data such as differences in execution time, execution cost, and/or execution energy consumption to data center customers.

Figure 6:
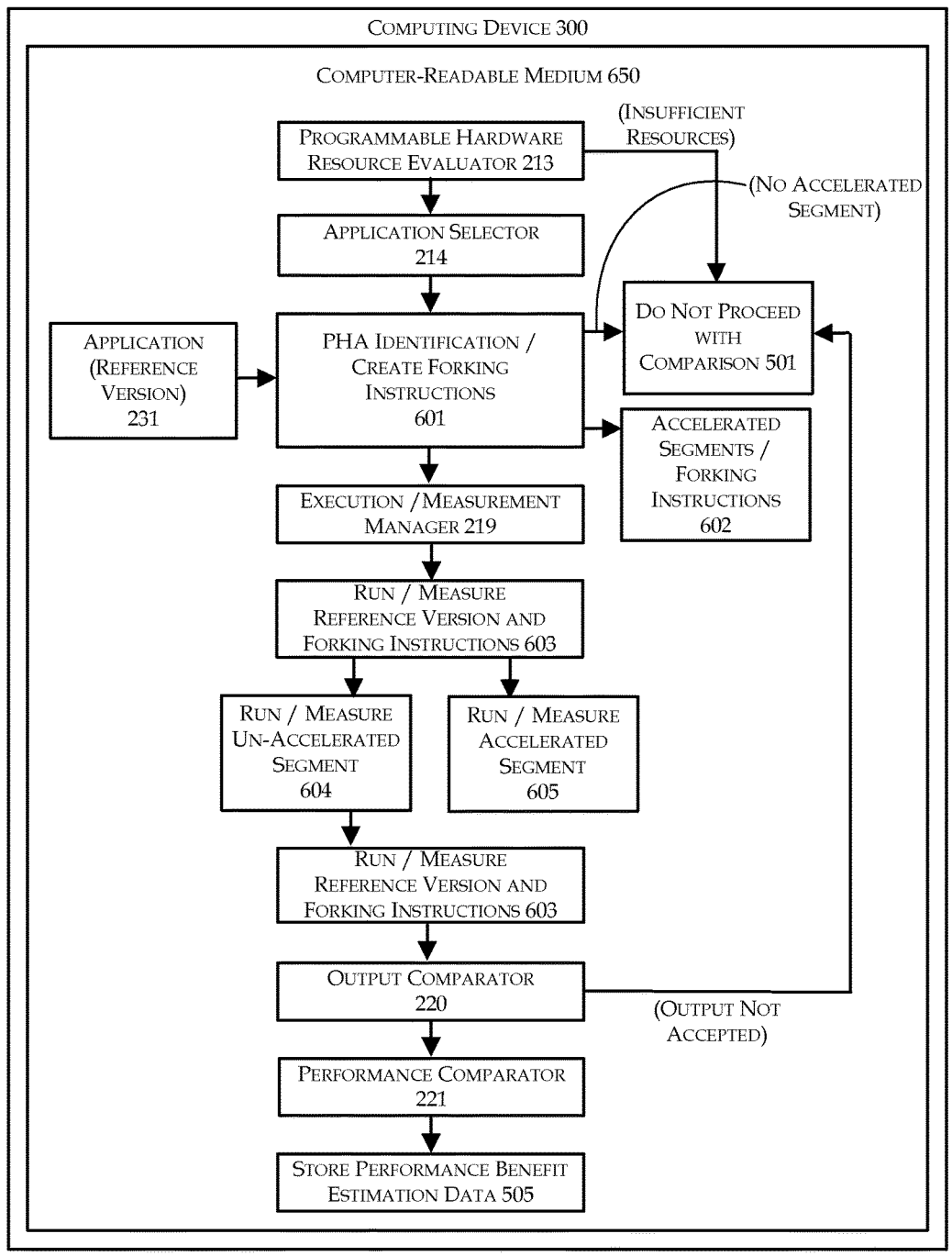
FIG. 6 is a flow diagram illustrating an example method for estimating programmable hardware acceleration benefit; all arranged in accordance with at least some embodiments of the present disclosure.

FIG. 6 is a flow diagram illustrating an example method for estimating programmable hardware acceleration benefit, arranged in accordance with at least some embodiments of the present disclosure. The example flow diagram may include one or more operations/modules as illustrated by blocks 213, 214, 601, 501, 231, 602, 219, 603, 604, 605, 220, 221, and 505, which represent operations as may be performed in a method, functional modules in a computing device 300, and/or instructions as may be recorded on a computer readable medium 650.

FIG. 6 includes blocks that are illustrated as being performed sequentially, e.g., with block 213 first and block 505 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 6 illustrates an example method for estimating programmable hardware acceleration benefit similar in some respects to methods according to FIG. 5, wherein like blocks are identified by like element numbers. In methods according to FIG. 6, acceleration techniques may include the use of accelerated segments of applications, wherein execution paths of reference versions may be forked to run both un-accelerated segments and accelerated segments. Performance measurement may be modified to measure the accelerated and un-accelerated execution paths, and optionally to combine these measurements with measurements of un-forked segments of the reference version.

In FIG. 6, blocks 213 and 214 may operate as described in connection with FIG. 5 and FIG. 2. Block 214 may be followed by block 601. At a "PHA Identification/Create Forking instructions" block 601, computing device 300 may identify and/or synthesize PHAs for use with reference version 231, as described herein. Instead of building a full accelerated version such as accelerated version 232 as illustrated in FIG. 5, block 601 may create accelerated segments and forking instructions 602. Accelerated segments and forking instructions 602 may adapt execution manager 219 to fork execution of reference version 231 into at least two execution paths, including an execution path for an accelerated segment and an execution path for a corresponding original, un-accelerated segment of reference version 231. Accelerated segments and forking instructions 602 may include as many different accelerated segments and forking instructions as desired to accelerate reference version 231. Block 601 may be followed by block 219.

At "Execution/Measurement Manager" block 219, computing device 300 may generally set up and initiate the execution and measurement of reference version 231 and accelerated segments from block 602. Block 219 may for example set up and manage operations of blocks 603, 604, and 605 as described below. Block 219 may be followed by block 603.

At a "Run/Measure Reference Version and Forking Instructions" block 603, computing device 300 may run and measure reference version 231 at computing device(s) 230, such as at example computing device 100, and computing device 300 may adapt computing device 100 to fork reference version 231 to run and measure accelerated segments from block 602. Computing device 300 may initiate block 603 by initiating execution of reference version 231 at computing device 100, or by initiating measurement of reference version 231, e.g., by performance measurement 233 illustrated in FIG. 2, in response to a user initiation of reference version 231. Computing device 300 may load forking instructions from block 602 at computing device 100. Computing device 300 may load PHAs included in the accelerated segments from block 602 at computing device 100, e.g. by loading PHAs at FPGA 160.

At a "Run/Measure Un-Accelerated Segment" block 604 and a "Run/Measure Accelerated Segment" block 605, in response to a forking instruction, computing device 100 may fork an execution path of reference version 231 to run both an un-accelerated segment of reference version 231, and an accelerated segment from block 602, which accelerated segment may include operation of a PHA loaded in FPGA 160. Block 604 may make performance measurements of the un-accelerated segment and block 605 may make performance measurements of the accelerated segment. When execution and measurement of the accelerated segment at block 605 is complete, methods may terminate the execution path comprising the accelerated segment. When execution and measurement of the un-accelerated segment at block 604 is complete, the execution path comprising the un-accelerated segment may continue/return to block 603. Block 603 may continue with the execution and measurement of reference version 231 until another forking instruction, or until execution and/or measurement of reference version 231 is discontinued. Blocks 603, 604 and/or 605 may be followed by block 220.

At "Output Comparator" block 220, computing device 300 may compare application outputs as described in connection with FIG. 5 and FIG. 2. In embodiments according to FIG. 6, compared outputs may comprise outputs from blocks 604 and 605. Block 220 may be followed by block 221.

At "Performance Comparator" block 221, computing device 300 may compare performance measurements as described in connection with FIG. 5 and FIG. 2. In some embodiments according to FIG. 6, block 221 may calculate performance of reference version 231 by combining measurements associated with block 603 with measurements associated with block 604, and may calculate performance of a "virtual" accelerated version by combining measurements associated with block 603 with measurements associated with block 605. Differences between combined measurements associated with reference version 231 and the virtual accelerated version may then be determined as described herein. In some embodiments, block 221 may determine performance differences between blocks 604 and 605, without considering performance measurements associated with block 603. Block 221 may be followed by block 505. Operations of block 505 are described with reference to FIG. 5.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly inter-actable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method to estimate programmable hardware acceleration benefit, the method comprising:
   executing, by one or more computing devices in a data center, a reference version of an application to perform one or more tasks for a data center customer;
   measuring one or more of an execution time, an execution cost, or an execution energy consumption to execute the reference version of the application;
   identifying one or more programmable hardware accelerators for the application, wherein the identified one or more programmable hardware accelerators are not being utilized during the execution of the reference version of the application;
   automatically executing, by the one or more computing devices, an accelerated version of the application to perform the one or more tasks performed by the reference version of the application, wherein the accelerated version of the application is accelerated by use of the identified one or more programmable hardware accelerators;
   measuring one or more of an execution time, an execution cost, or an execution energy consumption to execute the accelerated version of the application;
   calculating one or more of a difference in execution time between the reference version of the application and the accelerated version of the application, a difference in execution cost between the reference version of the application and the accelerated version of the application, or a difference in execution energy consumption between the reference version of the application and the accelerated version of the application;
   storing performance benefit estimation data that comprises one or more of the calculated difference in the execution time between the reference version of the application and the accelerated version of the application, the calculated difference in the execution cost between the reference version of the application and the accelerated version of the application, or the calculated difference in the execution energy consumption between the reference version of the application and the accelerated version of the application;
   providing, via a user interface, the stored performance benefit estimation data to the data center customer to enable the data center customer to select an activation of the accelerated version of the application;
   receiving, via the user interface from the data center customer and in response to the performance benefit estimation data being provided to the data center customer, a selection for the activation of the accelerated version of the application; and
   activating the accelerated version of the application, by use of the identified one or more programmable hardware accelerators, in response to the received selection.

2. The method of claim 1, further comprising determining whether programmable hardware resources are available for use in the data center, and postponing estimation of the programmable hardware acceleration benefit when insufficient programmable hardware resources are available for use in the data center.

3. The method of claim 1, wherein the identifying the one or more programmable hardware accelerators for the application comprises analyzing code in the application for a segment of the application that is at least partially replaceable by a programmable hardware accelerator.

4. The method of claim 3, further comprising retrieving the programmable hardware accelerator from a library of programmable hardware accelerators to at least partially replace the segment of the application.

5. The method of claim 3, further comprising generating the programmable hardware accelerator to at least partially replace the segment of the application.

6. The method of claim 3, wherein the analyzing the code in the application comprises performing a flow extraction process.

7. The method of claim 3, wherein the analyzing the code in the application comprises performing a hash comparison process.

8. The method of claim 1, further comprising comparing outputs generated by the reference version of the application and the accelerated version of the application to determine whether the compared outputs are substantially identical.

9. The method of claim 1, wherein the automatically executing the accelerated version of the application comprises forking the reference version of the application to run accelerated segments of the application in parallel with un-accelerated segments of the application executed by the reference version of the application.

10. The method of claim 1, wherein the automatically executing the accelerated version of the application comprises performing the automatic execution of the accelerated version of the application simultaneously with the execution of the reference version of the application.

11. The method of claim 1, wherein the measuring the one or more of the execution time, the execution cost, or the execution energy consumption to execute the reference version of the application, the identifying the one or more programmable hardware accelerators for the application, the measuring the one or more of the execution time, the execution cost, or the execution energy consumption to execute the accelerated version of the application, the calculating differences between the one or more of the execution time, the execution cost, or the execution energy consumption of the reference version of the application and the one or more of the execution time, the execution cost, or the execution energy consumption of the accelerated version of the application, and the storing the performance benefit estimation data are performed automatically.

12. The method of claim 1, further comprising aggregating differences between the reference version of the application and the accelerated version of the application, wherein the aggregated differences correspond to multiple instances of the execution of the reference version of the application and the accelerated version of the application, and wherein the storing the performance benefit estimation data comprises storing a report that summarizes the differences that correspond to the multiple instances.

13. The method of claim 1, further comprising checking a device execution history of the one or more computing devices to verify use of the identified one or more programmable hardware accelerators during the execution of the accelerated version of the application.

14. The method of claim 1, wherein identifying the one or more programmable hardware accelerators for the application comprises decompiling the reference version of the application, using the decompiled reference version of the application to identify or synthesize the one or more programmable hardware accelerators for use with the application, and building the accelerated version of the application to employ the identified or synthesized one or more programmable hardware accelerators.

15. A non-transitory computer readable storage medium having computer executable instructions executable by a processor, wherein the instructions, in response to execution by the processor, implement a programmable hardware acceleration benefit estimator, which causes the processor to perform or control performance of operations to:
    measure one or more of an execution time, an execution cost, or an execution energy consumption to execute a reference version of an application to perform one or more tasks for a data center customer;
    identify one or more programmable hardware accelerators for the application, wherein the identified one or more programmable hardware accelerators are not being utilized during the execution of the reference version of the application;
    automatically execute an accelerated version of the application to perform the one or more tasks performed by the reference version of the application, wherein the accelerated version of the application is accelerated by use of the identified one or more programmable hardware accelerators;
    measure one or more of an execution time, an execution cost, or an execution energy consumption to execute the accelerated version of the application;
    calculate one or more of a difference in execution time between the reference version of the application and the accelerated version of the application, a difference in execution cost between the reference version of the application and the accelerated version of the application, or a difference in execution energy consumption between the reference version of the application and the accelerated version of the application;
    store performance benefit estimation data that comprises one or more of the calculated difference in the execution time between the reference version of the application and the accelerated version of the application, the calculated difference in the execution cost between the reference version of the application and the accelerated version of the application, or the calculated difference in the execution energy consumption between the reference version of the application and the accelerated version of the application;
    provide, via a user interface, the stored performance benefit estimation data to the data center customer to enable the data center customer to select an activation of the accelerated version of the application;
    detect, via the user interface, a selection for the activation of the accelerated version of the application by the data center customer in response to the performance benefit estimation data being provided to the data center customer; and
    activate the accelerated version of the application, by use of the identified one or more programmable hardware accelerators, in response to the detected selection.

16. The non-transitory computer readable storage medium of claim 15, further comprising instructions that, in response to execution by the processor, implement the programmable hardware acceleration benefit estimator to cause the processor to perform or control performance of at least one operation:
    determine whether programmable hardware resources are available for use in the data center; and
    postpone estimation of programmable hardware acceleration benefit when insufficient programmable hardware resources are available for use in the data center.

17. The non-transitory computer readable storage medium of claim 15, wherein the identification of the one or more programmable hardware accelerators for the application comprises analysis of code in the application for a segment of the application that is at least partially replaceable by a programmable hardware accelerator.

18. The non-transitory computer readable storage medium of claim 17, further comprising instructions that, in response to execution by the processor, implement the programmable hardware acceleration benefit estimator to cause the processor to perform or control performance of at least one operation to retrieve the programmable hardware accelerator from a library of programmable hardware accelerators to at least partially replace the segment of the application.

19. The non-transitory computer readable storage medium of claim 17, further comprising instructions that, in response to execution by the processor, implement the programmable hardware acceleration benefit estimator to cause the processor to perform or control performance of at least one operation to generate the programmable hardware accelerator to at least partially replace the segment of the application.

20. The non-transitory computer readable storage medium of claim 17, wherein the analysis of the code in the application comprises a flow extraction process.

21. The non-transitory computer readable storage medium of claim 17, wherein the analysis of the code in the application comprises a hash comparison process.

22. The non-transitory computer readable storage medium of claim 15, further comprising instructions that, in response to execution by the processor, implement the programmable hardware acceleration benefit estimator to cause the processor to perform or control performance of at least one operation to compare outputs generated by the reference version of the application and the accelerated version of the application to determine whether the compared outputs are substantially identical.

23. The non-transitory computer readable storage medium of claim 15, wherein the automatic execution of the accelerated version of the application comprises the reference version of the application being forked to run accelerated segments of the application in parallel with un-accelerated segments of the application executed by the reference version of the application.

24. The non-transitory computer readable storage medium of claim 15, wherein the automatic execution of the accelerated version of the application is performed simultaneously with the execution of the reference version of the application.

25. The non-transitory computer readable storage medium of claim 15, wherein the measurement of the one or more of the execution time, the execution cost, or the execution energy consumption for the execution of the reference version of the application, the identification of the one or more programmable hardware accelerators for the application, the measurement of the one or more of the execution time, the execution cost, or the execution energy consumption for execution of the accelerated version of the application, the calculation of the differences between the one or more of the execution time, the execution cost, or the execution energy consumption of the reference version of the application and the one or more of the execution time, the execution cost, or the execution energy consumption of the accelerated version of the application, and the storage of the performance benefit estimation data are performed automatically.

26. The non-transitory computer readable storage medium of claim 15, further comprising instructions that, in response to execution by the processor, implement the programmable hardware acceleration benefit estimator to cause the processor to perform or control performance of at least one operation to aggregate differences between the reference version of the application and the accelerated version of the application, wherein the aggregated differences correspond to multiple instances of the execution of the reference version of the application and the accelerated version of the application, and wherein the storage of the performance benefit estimation data comprises storage of a report that summarizes the differences that correspond to the multiple instances.

27. The non-transitory computer readable storage medium of claim 15, further comprising instructions that, in response to execution by the processor, implement the programmable hardware acceleration benefit estimator to cause the processor to perform or control performance of at least one operation to check a device execution history of one or more computing devices to verify use of the one or more identified programmable hardware accelerators during the execution of the accelerated version of the application.

28. A computing device configured to estimate programmable hardware acceleration benefit, the computing device comprising:
a processor;
a memory operatively coupled to the processor; and
a programmable hardware acceleration benefit estimator stored in the memory and executable by the processor, wherein the programmable hardware acceleration benefit estimator is configured to:
measure one or more of an execution time, an execution cost, or an execution energy consumption to execute a reference version of an application to perform one or more tasks for a data center customer;
identify one or more programmable hardware accelerators for the application, wherein the identified one or more programmable hardware accelerators are not being utilized during the execution of the reference version of the application;
automatically execute an accelerated version of the application to perform the one or more tasks performed by the reference version of the application, wherein the accelerated version of the application is accelerated by use of the identified one or more programmable hardware accelerators;
measure one or more of an execution time, an execution cost, or an execution energy consumption to execute the accelerated version of the application;
calculate one or more of a difference in execution time between the reference version of the application and the accelerated version of the application, a difference in execution cost between the reference version of the application and the accelerated version of the application, or a difference in execution energy consumption between the reference version of the application and the accelerated version of the application;
store performance benefit estimation data that comprises one or more of the calculated difference in the execution time between the reference version of the application and the accelerated version of the application, the calculated difference in the execution cost between the reference version of the application and the accelerated version of the application, or the calculated difference in the execution energy consumption between the reference version of the application and the accelerated version of the application;
provide, via a user interface, the stored performance benefit estimation data to the data center customer to enable the data center customer to select an activation of the accelerated version of the application;
receive, via the user interface from the data center customer and in response to the performance benefit estimation data being provided to the data center customer, a selection for the activation of the accelerated version of the application; and
activate the accelerated version of the application, by use of the identified one or more programmable hardware accelerators, in response to the received selection.

29. The computing device of claim 28, wherein the programmable hardware acceleration benefit estimator is configured to determine whether programmable hardware resources are available for use in the data center, and to postpone estimation of the programmable hardware acceleration benefit when insufficient programmable hardware resources are available for use in the data center.

30. The computing device of claim 28, wherein to identify the one or more programmable hardware accelerators for the application, the programmable hardware acceleration benefit estimator is configured to analyze code in the application for a segment of the application that is at least partially replaceable by a programmable hardware accelerator.

31. The computing device of claim 30, wherein the programmable hardware acceleration benefit estimator is configured to retrieve the programmable hardware accelerator from a library of programmable hardware accelerators to at least partially replace the segment of the application.

32. The computing device of claim 30, wherein the programmable hardware acceleration benefit estimator is configured to generate the programmable hardware accelerator to at least partially replace the segment of the application.

33. The computing device of claim 30, wherein to analyze the code in the application, the programmable hardware acceleration benefit estimator is configured to perform a flow extraction process.

34. The computing device of claim 30, wherein to analyze the code in the application, the programmable hardware acceleration benefit estimator is configured to perform a hash comparison process.

35. The computing device of claim 28, wherein the programmable hardware acceleration benefit estimator is configured to compare outputs generated by the reference version of an application and the accelerated version of the application to determine whether the compared outputs are substantially identical.

36. The computing device of claim 28, wherein to automatically execute the accelerated version of the application, the programmable hardware acceleration benefit estimator is configured to fork the reference version of the application to run accelerated segments of the application in parallel with un-accelerated segments of the application executed by the reference version of the application.

37. The computing device of claim 28, wherein the programmable hardware acceleration benefit estimator is configured to automatically execute the accelerated version of the application simultaneously with the execution of the reference version of the application.

38. The computing device of claim 28, wherein the programmable hardware acceleration benefit estimator is configured to measure the one or more of the execution time, the execution cost, or the execution energy consumption for execution of the reference version of the application, to identify the one or more programmable hardware accelerators for the application, to measure the one or more of the execution time, the execution cost, or the execution energy consumption for execution of the accelerated version of the application, to calculate the differences between the one or more of the execution time, the execution cost, or the execution energy consumption of the reference version of the application and the one or more of the execution time, the execution cost, or the execution energy consumption of the accelerated version of the application, and to store the performance benefit estimation data automatically.

39. The computing device of claim 28, wherein the programmable hardware acceleration benefit estimator is configured to aggregate differences between the reference version of the application and the accelerated version of the application, wherein the aggregated differences correspond to multiple instances of execution of the reference version of the application and the accelerated version of the application, and wherein the storage of the performance benefit estimation data comprises storage of a report that summarizes the differences that correspond to the multiple instances.

40. The computing device of claim 28, wherein the programmable hardware acceleration benefit estimator is configured to check a device execution history of one or more computing devices to verify use of the one or more identified programmable hardware accelerators during the execution of the accelerated version of the application.

41. A method to estimate programmable hardware acceleration benefit in a data center, the method comprising:
providing customer-activated acceleration of one or more applications executed by one or more computing devices in the data center, wherein the customer-activated acceleration employs one or more programmable hardware accelerators to perform one or more application tasks;
selecting an application for which the customer-activated acceleration is not activated by a data center customer;
measuring one or more of an execution time, an execution cost, or an execution energy consumption to execute a reference version of the application without the customer-activated acceleration;
automatically executing, by the one or more computing devices, an accelerated version of the selected application, wherein the accelerated version of the application is accelerated by use of the one or more programmable hardware accelerators;
measuring one or more of an execution time, an execution cost, or an execution energy consumption to execute the accelerated version of the application;
calculating one or more of a difference in execution time between the reference version of the application and the accelerated version of the application, a difference in execution cost between the reference version of the application and the accelerated version of the application, or a difference in execution energy consumption between the reference version of the application and the accelerated version of the application;
storing performance benefit estimation data that comprises the calculated difference in the execution time between the reference version of the application and the accelerated version of the application, the calculated difference in the execution cost between the reference version of the application and the accelerated version of the application, or the calculated difference in the execution energy consumption between the reference version of the application and the accelerated version of the application;
providing, via a user interface, the stored performance benefit estimation data to the data center customer to enable the data center customer to select the customer-activated acceleration of the one or more applications;
receiving, via the user interface from the data center customer and in response to the performance benefit estimation data being provided to the data center customer, a selection of the customer-activated acceleration of the one or more applications; and
activating the accelerated version of the application, by use of the one or more programmable hardware accelerators, in response to the received selection of the customer-activated acceleration.

42. The method of claim 41, further comprising identifying the one or more programmable hardware accelerators for the application, wherein the identified one or more programmable hardware accelerators are not used by the reference version of the application.

43. The method of claim 42, wherein the identifying the one or more programmable hardware accelerators for the application comprises analyzing code in the application for a segment of the application that is at least partially replaceable by a programmable hardware accelerator.

44. The method of claim 41, further comprising comparing outputs generated by the reference version of the application and the accelerated version of the application to determine whether the compared outputs are substantially identical.

45. The method of claim 41, wherein automatically the accelerated version of the application comprises forking the reference version of the application to execute accelerated segments of the application in parallel with un-accelerated segments of the application executed by the reference version of the application.

46. The method of claim 41, wherein automatically the accelerated version of the application is performed simultaneously with the execution of the reference version of the application.

47. The method of claim 41, further comprising aggregating differences between the reference version of the application and the accelerated version of the application, wherein the aggregated differences correspond to multiple instances of the execution of the reference version of the application and the accelerated version of the application, and wherein storing the performance benefit estimation data comprises storing a report that summarizes the differences that correspond to the multiple instances.

48. The method of claim 41, further comprising checking a device execution history of the one or more computing devices to verify use of the one or more identified programmable hardware accelerators during the execution of the accelerated version of the application.

49. The method of claim 41, further comprising determining whether programmable hardware resources are available for use in the data center, and postponing estimation of the programmable hardware acceleration benefit when insufficient programmable hardware resources are available for use in the data center.

50. The method of claim 41, wherein selecting the application for which the customer-activated acceleration is not activated by the data center customer comprises selecting an application with an identified application type or an application that comprises an identified application segment type, wherein the identified application type or the identified application segment type is established, prior to selection of the application, as operable with at least one identified programmable hardware accelerator.

\* \* \* \* \*

UNITED STATES PATENT AND TRADEMARK OFFICE
CERTIFICATE OF CORRECTION

| | | |
|---|---|---|
| PATENT NO. | : 9,747,185 B2 | Page 1 of 1 |
| APPLICATION NO. | : 13/850671 | |
| DATED | : August 29, 2017 | |
| INVENTOR(S) | : Fine | |

It is certified that error appears in the above-identified patent and that said Letters Patent is hereby corrected as shown below:

In the Specification

In Column 4, Line 62, delete "demand Automatically" and insert -- demand. Automatically --, therefor.

In the Claims

In Column 26, Line 19, in Claim 16, delete "operation:" and insert -- operation to: --, therefor.

In Column 30, Line 53, in Claim 45, delete "automatically the" and insert -- automatically executing the --, therefor.

In Column 30, Line 59, in Claim 46, delete "automatically the" and insert -- automatically executing the --, therefor.

Signed and Sealed this
Twenty-fourth Day of April, 2018

Andrei Iancu
*Director of the United States Patent and Trademark Office*